United States Patent
Umemura et al.

(10) Patent No.: US 6,674,481 B1
(45) Date of Patent: Jan. 6, 2004

(54) DISPLAY APPARATUS, MARKER SIGNAL MAKING PROCESS, MARKER SIGNAL DETECTOR CIRCUIT, AND CONTROL SIGNAL GENERATOR CIRCUIT

(75) Inventors: Shunji Umemura, Tokyo (JP); Ichiro Sato, Tokyo (JP); Katsuhiro Shimizu, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/336,624

(22) Filed: Jun. 18, 1999

Related U.S. Application Data

(63) Continuation of application No. PCT/JP98/04747, filed on Oct. 20, 1998.

(30) Foreign Application Priority Data

Oct. 20, 1997 (JP) .............................................. 9-287050
Apr. 1, 1998 (JP) .......................................... 10-088958

(51) Int. Cl.$^7$ .......................... H04N 7/00; H04N 11/01
(52) U.S. Cl. ...................... 348/461; 348/468; 348/576
(58) Field of Search .............................. 348/588, 674, 348/675, 561, 562, 576, 577, 603, 685, 686–688, 695–696, 600, 601, 465, 461, 181–185, 563–564, 569; H04N 7/00, 11/01

(56) References Cited

U.S. PATENT DOCUMENTS

| | | | | |
|---|---|---|---|---|
| 4,068,847 A | * | 1/1978 | Lukkarila et al. ............ | 348/601 |
| 4,354,202 A | * | 10/1982 | Harlan ........................ | 348/600 |
| 4,368,486 A | * | 1/1983 | Degoulet et al. ............ | 348/598 |
| 4,635,096 A | * | 1/1987 | Morgan ...................... | 348/181 |
| 5,161,236 A | * | 11/1992 | Nakayama et al. .......... | 348/564 |
| 5,319,446 A | * | 6/1994 | Emmoto et al. ............. | 348/181 |
| 5,450,134 A | * | 9/1995 | Legate ........................ | 348/467 |
| 5,652,602 A | * | 7/1997 | Fishman et al. ............. | 348/465 |
| 5,729,248 A | * | 3/1998 | Hwang ........................ | 348/141 |
| 5,818,520 A | * | 10/1998 | Janko et al. ................. | 348/192 |
| 5,841,251 A | * | 11/1998 | Vroemen et al. ............ | 348/181 |
| 6,141,042 A | * | 10/2000 | Martinelli et al. ........... | 348/181 |
| 6,215,526 B1 | * | 4/2001 | Barton et al. ................ | 348/473 |
| 6,292,216 B1 | * | 9/2001 | Shimizu et al. .............. | 348/177 |
| 6,362,816 B1 | * | 3/2002 | Kawanami et al. .......... | 345/214 |

FOREIGN PATENT DOCUMENTS

| | | | |
|---|---|---|---|
| JP | 61-182389 | * | 8/1986 |
| JP | 63-33073 | * | 2/1988 |

(List continued on next page.)

*Primary Examiner*—Michael H. Lee
(74) *Attorney, Agent, or Firm*—Jay H. Maioli

(57) ABSTRACT

The present invention relates to a display apparatus, a marker signal making process, a marker signal detector circuit, and a control signal generator circuit that are suitable for use when making a display in which a display screen is divided into a plurality of areas and images whose picture qualities are different at every area are displayed. Thus, in the present invention, image signals (R/G/B) from input terminals 1R, 1G, 1B are supplied to a preamplifier IC 3, e.g. to respective sharpness improving circuits 32R, 32G, 32B therein. Image signals derived from the preamplifier IC 3 are subjected to DC voltage conversion by a cutoff adjusting amplifier 6 and then supplied, e.g. to a cathode ray tube 7 as a display means. A microcomputer 40 which is present within this apparatus and controls various kinds of functions forms first and second DC voltage data for controlling, e.g. the sharpness. These data are made into analog control DC voltage by D/A converters 34A, 34B and then selected by a switching circuit 36 to be supplied to the preamplifier IC 3. This switching circuit 36 is controlled by an arbitrary control signal. This enables the picture quality of image of photograph, moving video, etc. to be improved without making the information on characters, numerics, etc. hard to see, when displaying the image of photograph, moving video, etc. together with the information on characters, numerics etc.

7 Claims, 12 Drawing Sheets

FOREIGN PATENT DOCUMENTS

| | | | |
|---|---|---|---|
| JP | 63-189086 | * | 8/1988 |
| JP | 1-165268 | * | 6/1989 |
| JP | 5-236348 | * | 9/1993 |
| JP | 6-225326 | * | 8/1994 |
| JP | 8-65543 | * | 3/1996 |
| JP | 8-251503 | * | 9/1996 |
| JP | 9-139865 | * | 5/1997 |

* cited by examiner

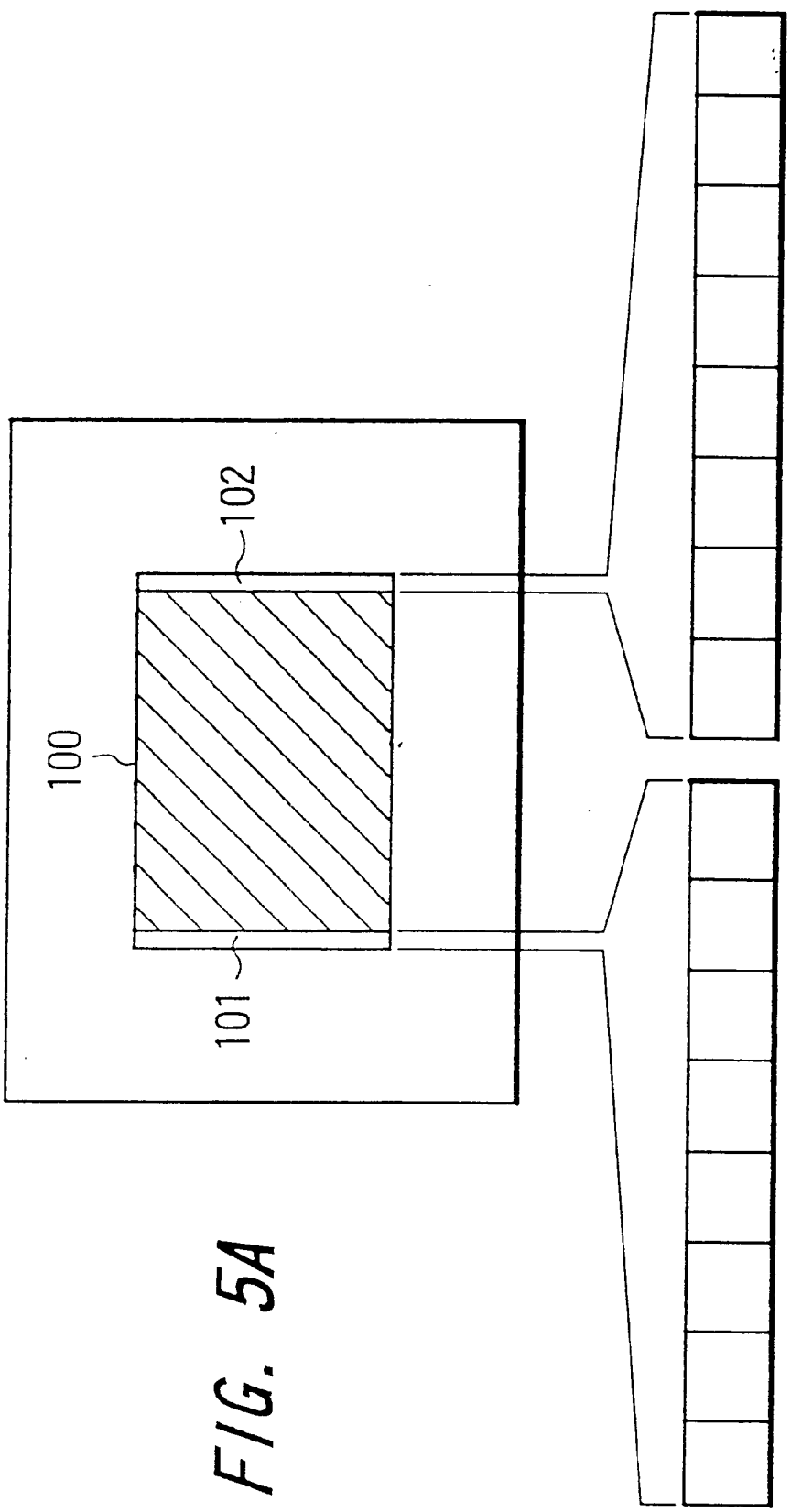

4 3 2 1

4      3      2      1

DISPLAY APPARATUS, MARKER SIGNAL MAKING PROCESS, MARKER SIGNAL DETECTOR CIRCUIT, AND CONTROL SIGNAL GENERATOR CIRCUIT

This application is a continuation under 35 USC 111 (a) of International application No. PCT/JP98/04747, filed Oct. 20, 1998, which claims priority of earlier filed Japanese applications P9-1287050 filed Oct. 20, 1997 and P10-088958 filed Apr. 1, 1998.

TECHNICAL FIELD

The present invention relates to a display apparatus, a marker signal making process, a marker signal detector circuit, and a control signal generator circuit that are suitable for use when making a display in which, e.g. a display screen is divided into a plurality of areas and images whose picture qualities are different in every area are displayed. Particularly, the present invention relates to the display apparatus, the marker signal making process, the marker signal detector circuit, and the control signal generator circuit in which, when an image signal is displayed on a screen provided with an area for displaying information on characters, numerics, etc. and an area for displaying an acquired image of photograph, moving video, etc., the picture quality of displayed photograph, moving video, etc. is improved especially without degrading the displayed characters, numerics, etc.

BACKGROUND ART

In a display apparatus of a television receiver, etc. which displays, e.g. image signals by a television broadcast or image signals reproduced from a video tape, etc., in order to improve the displayed picture quality for a still image represented-by a photograph picture, etc. and a moving image represented by a motion picture, etc., picture quality improving techniques such as enlargement of brightness difference (hereinafter referred to as contrast ratio) between white level and black level of displayed image, e. g. by increasing the amplification factor for image signals or by emphasizing outlines of images (hereinafter referred to as sharpness) etc. have heretofore been practiced.

Moreover, various kinds of semiconductor integrated circuits hereinafter referred to as IC), etc. have been implemented that have at least one of these picture quality improving functions and is arranged to control these picture quality improving functions, e.g. by exterior direct current voltage (hereinafter referred to as DC voltage) or by control means using an information communicating means such as what is called a bus communication or the like. As a typical one of them, e.g. a preamplifier IC used for an image amplifier circuit, a RGB decoding IC for resolving from luminance/color difference signals into R/G/B signals, and the like are known.

FIG. 17 shows an example of a structure of display apparatus having such a picture quality improving function. Further, in FIG. 17, for making easy to understand advantageous effects of the present invention described below, a structure of display apparatus of a monitor display apparatus which receives signals, e.g. from a computer equipment is shown. Prior art will be described with reference to this structure.

In FIG. 17, image signals of red, green, blue (R/G/B) input, e.g. to input terminals 701R, 701G, 701B are supplied through respective capacitors 702R, 702G, 702B to a preamplifier IC 703. In the preamplifier IC 703, the supplied image signals (R/G/B) are supplied through respective clamping circuits 801R, 801G, 801B to sharpness improving circuit 802R, 802G, 802B and taken out through amplifiers 803R, 803G, 803B.

From a microcomputer (hereinafter referred to as micon) 700 that is present within the apparatus and controls various kinds of functions is output, e. g. sharpness control DC voltages and contrast ratio control DC voltages, which are supplied to the preamplifier IC 703. Thus, in the preamplifier IC 703, e. g. the sharpness improving circuits 802R, 802G, 802B and the amplifiers 803R, 803G, 803B are controlled so that the sharpness and the contrast ratio may be improved, respectively.

Image signals (R/G/B) derived from the preamplifier IC 703 are further amplified by an output amplifier 704 and then taken out through capacitors 705R, 705G, 705B. These resulting image signals (R/G/B) are subjected to DC voltage conversion by a cut off adjusting amplifier 706 and then supplied to, e.g. a cathode ray tube (hereinafter referred to as CRT) 707 that is a display means, thus causing the image by image signals (R/G/B) with improved picture quality to be displayed on a screen of CRT 707.

By the way, in the monitor display apparatus for displaying, e.g. outputs from the computer, its primary object in the past has been to display information on characters, numerics, etc. of documents, table calculations, etc. output from the computer. For this reason, the monitor display apparatus has generally been used for displaying image signals supplied from the computer, e.g. in the form of a binary signal "1/0" on a proper brightness level.

In contrast, recent computers called multimedia display not only the above-mentioned information on characters, numerics, etc. but also an image of photograph, moving video or the like taken from a disk unit or a video card in an arbitrary area called a window. In that case, an image of the thus acquired photograph, moving video, etc. is lower in the contrast and sharpness as compared with the information on characters, numerics, etc., and so if these are displayed together, the picture quality of displayed photograph, moving video, etc. looks remarkably deteriorated.

Accordingly, in such a monitor display apparatus, for the purpose of improving the picture quality of images of photograph, moving video, etc., the improvement of the contrast ratio and the sharpness has been considered.

However, in the conventional monitor display apparatus, the improvement of picture quality by the enlargement of brightness difference and the outline emphasis, etc is carried out uniformly over the entire display screen. For this reason, when there is an area displaying the characters, numerics, etc. in the screen, these displays may on the contrary turn hard to see. This makes eyes readily tired, particularly if the brightness displaying the characters, numerics, etc. is too high, which results in causing a picture quality deteriorating effect of disabling a long time watching (use) and the like.

In recent years, due to the development of so-called internet and the spread of teletext, even common television receivers have increasingly such opportunities as displaying the image of photograph, moving video, etc. together with the display of characters, numerics, etc. on one screen. Thus, in such television receivers, if the improvement of picture quality by the enlargement of brightness difference and the outline emphasis, etc. is carried out uniformly over the entire screen, a fear will be caused that the display of characters, numerics, etc. in the screen may turn hard to see.

The present invention has been made in consideration of these points. The problem intended to solve is that, with the conventional apparatus, when displaying the image of photograph, moving video, etc. together with the information on characters, numerics, etc., the picture quality of image of photograph, moving video, etc. looks remarkably deteriorated, but if the picture quality of these photograph, moving video, etc. is improved, the picture quality of the display of characters, numerics, etc. will turn worse.

DISCLOSURE OF INVENTION

The present invention is arranged to specify arbitrary areas on a display screen and apply respective arbitrary image processings to every specified area. This will enable the picture quality of image of photograph, moving video, etc. to be improved without making the information on characters, numerics, etc. hard to see, when the image of photograph, moving video, etc. is displayed together with the information on characters, numerics, etc. In this connection, the display apparatus, the marker signal making process, the marker signal detector circuit, and the control signal generator circuit according to the present invention will be disclosed.

BRIEF DESCRIPTION OF DRAWINGS

FIG. 5 is a explanatory diagram of an example of the marker signal making process according to a third mode for carrying out the present invention.

BEST MODE FOR CARRYING OUT THE INVENTION

Figure 1:
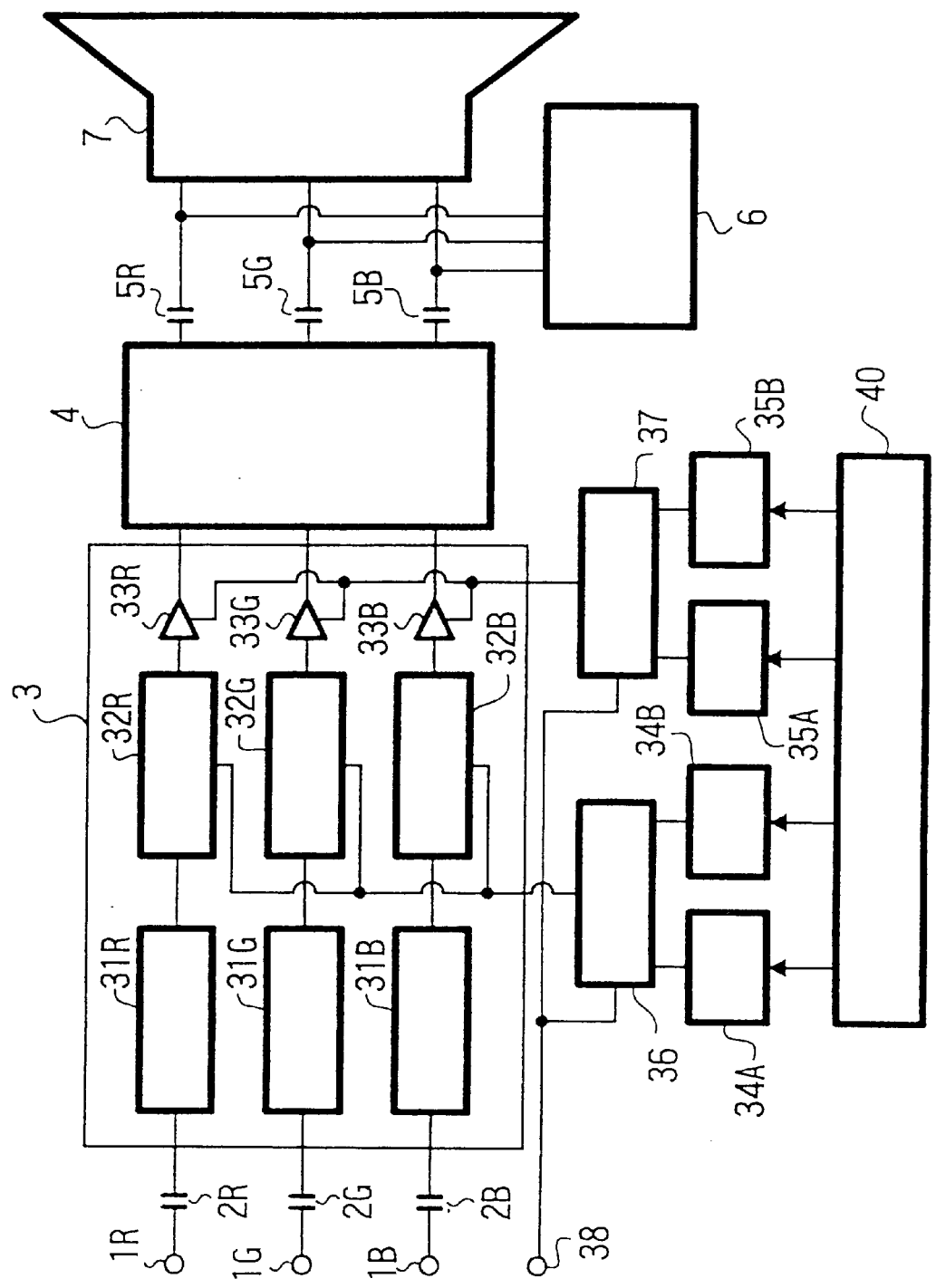
FIG. 1 is a structural diagram showing an example of the display apparatus according to a first mode for carrying out the present invention.

The present invention will be described below with reference to the drawings. FIG. 1 is a block diagram showing an example of a structure of monitor display apparatus to which the display apparatus according to the first mode for carrying out the present invention is applied.

In FIG. 1, image signals of red, green, blue (R/G/B) input to, e.g. input terminals 1R, 1G, 1B are supplied through respective capacitors 2R, 2G, 2B to a preamplifier IC 3. In this preamplifier IC 3, the supplied image signals (R/G/B) are supplied through respective clamping circuits 31R, 31G, 31B to sharpness improving circuits 32R, 32G, 32B described below, and further taken out through amplifiers 33R, 33G, 33B described below.

The image signals (R/G/B) derived from the preamplifier IC3 are further amplified by an output amplifier 4 and then taken out through capacitors 5R, 5G, 5B. These resulting image signals (R/G/B) are subjected to DC voltage conversion by a cut-off adjusting amplifier 6 and then supplied to a display means, e.g. cathode ray tube (hereinafter referred to as CRT) 7, thus causing an image by the image signals (R/G/B) improved in picture quality described later to be displayed on a screen of CRT 7.

A microcomputer (hereinafter referred to as micon) 40 which is present within this apparatus and controls various kinds of functions forms first and second DC voltage data for controlling, e.g. the aforesaid sharpness as well as a first and second DC voltage data for controlling the contrast ratio. The thus formed data are supplied to respective D/A converter (hereinafter referred to as DAC) circuits 34A, 34B and 35A, 35B where they are converted into control DC voltages, respectively.

The control DC voltage converted by these DAC circuits 34A, 34B and 35A, 35B are selected by respective switching circuits 36, 37 and supplied to the above-said preamplifier IC 33. This causes the preamplifier IC 3 to control, e.g. the respective sharpness improving circuits 32R, 32G, 32B and the amplifiers 33R, 33G, 33B in accordance with the supplied control DC voltages. Thus, the sharpness and contrast ratio are improved, respectively.

Furthermore, in this apparatus, to a control terminal 38 is supplied a control signal for specifying an arbitrary area on the display screen, e.g. from an exterior computer (not shown). This control signal here is such that, for an arbitrary area 100 on the display screen e.g. as shown in A of FIG. 2, a pulse signal corresponding to a horizontal width of the area 100 as shown in B of the figure and another pulse signal corresponding to a vertical width as shown in C of the figure are composed into a control signal as shown in D of the figure.

The control signal from the terminal 38 is supplied to the switch circuits 36, 37 which select the control DC voltages converted by the DAC circuits 34A or 34B, 35A or 35B. The control DC voltages selected by these switching circuits 36, 37 are supplied to the preamplifier IC 3 mentioned above, thereby making the sharpness and contrast ratio of the image in the arbitrary area specified by the control signal to be changed.

Figure 2A:
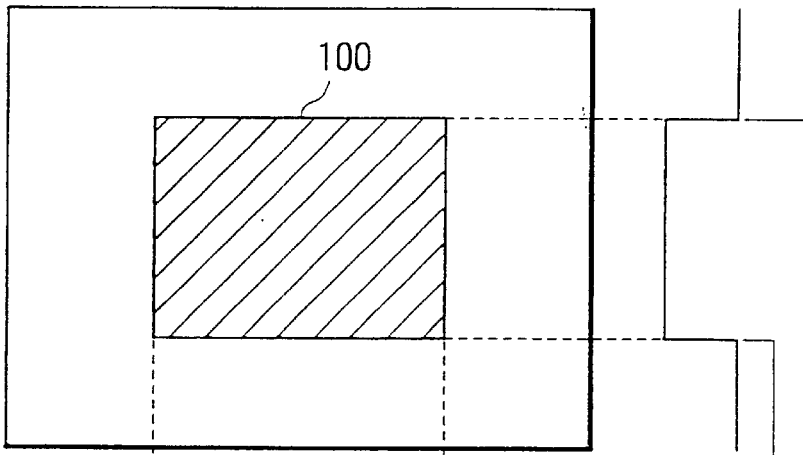
FIG. 2 is a diagram for explaining the same.
Figure 2B:
Figure 2C:
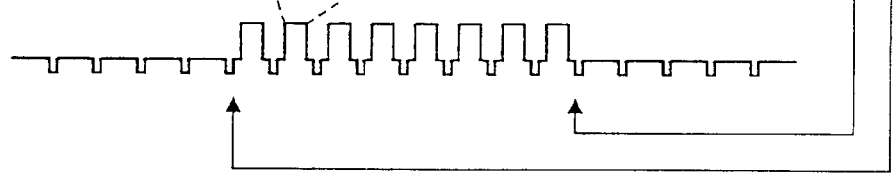

That is, in this apparatus, it is possible to make higher than in other area, e.g. the sharpness and contrast ratio of acquired image of photograph, moving video, etc. only in the area 100 on the display screen, thereby enabling the picture quality of acquired image of photograph, moving video, etc. in the area 100 to be improved. In addition, horizontal synchronizing signals included in the control signal in FIG. 2 are added on explanatory purpose and may sometimes be absent in the actual signal.

Therefore, in this apparatus, by specifying the arbitrary area on the screen and applying the arbitrary image processing only to that area, when displaying the acquired image of photograph, moving video, etc. together with the information on characters, numeric, etc., it is possible to improve the picture quality of acquired image without making the information on characters, numerics, etc. hard to see.

This means that the present invention can easily solve the aforesaid problem that, when displaying the acquired image together with the information on characters, numerics, etc. using the conventional apparatus, the picture quality of photograph, moving video, etc. looks remarkably deteriorated.

Additionally, having described above on making higher than in other area, e.g. the sharpness and contrast ratio of acquired image of photograph, moving video, etc. only in that area on the display screen for improving the picture quality, this can be replaced by other picture quality improving means using the gamma correction, the color correction and the like.

Figure 3:
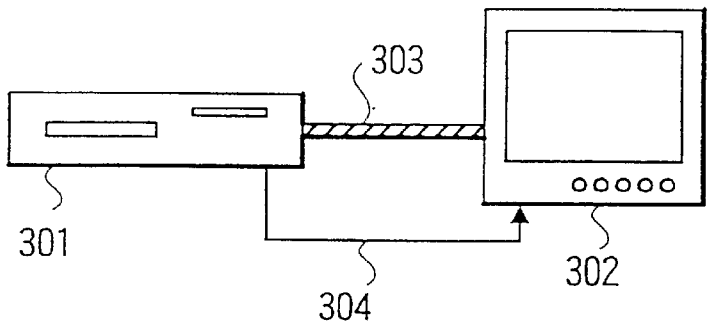
FIG. 3 is a diagram of its entire structure.

By the way, the above described first mode for carrying out the present invention requires, as shown in Fig.3, an exclusive line 304 for the aforesaid control signal in addition to a cable 303 for an image signal to be connected between, e.g. a personal computer 301 and a monitor display apparatus 302. Such an exclusive line 304 for the control signal can be replaced with, e.g. a vacant channel of the image signal cable 303. However, one signal line is occupied exclusively anyway.

Figure 4:
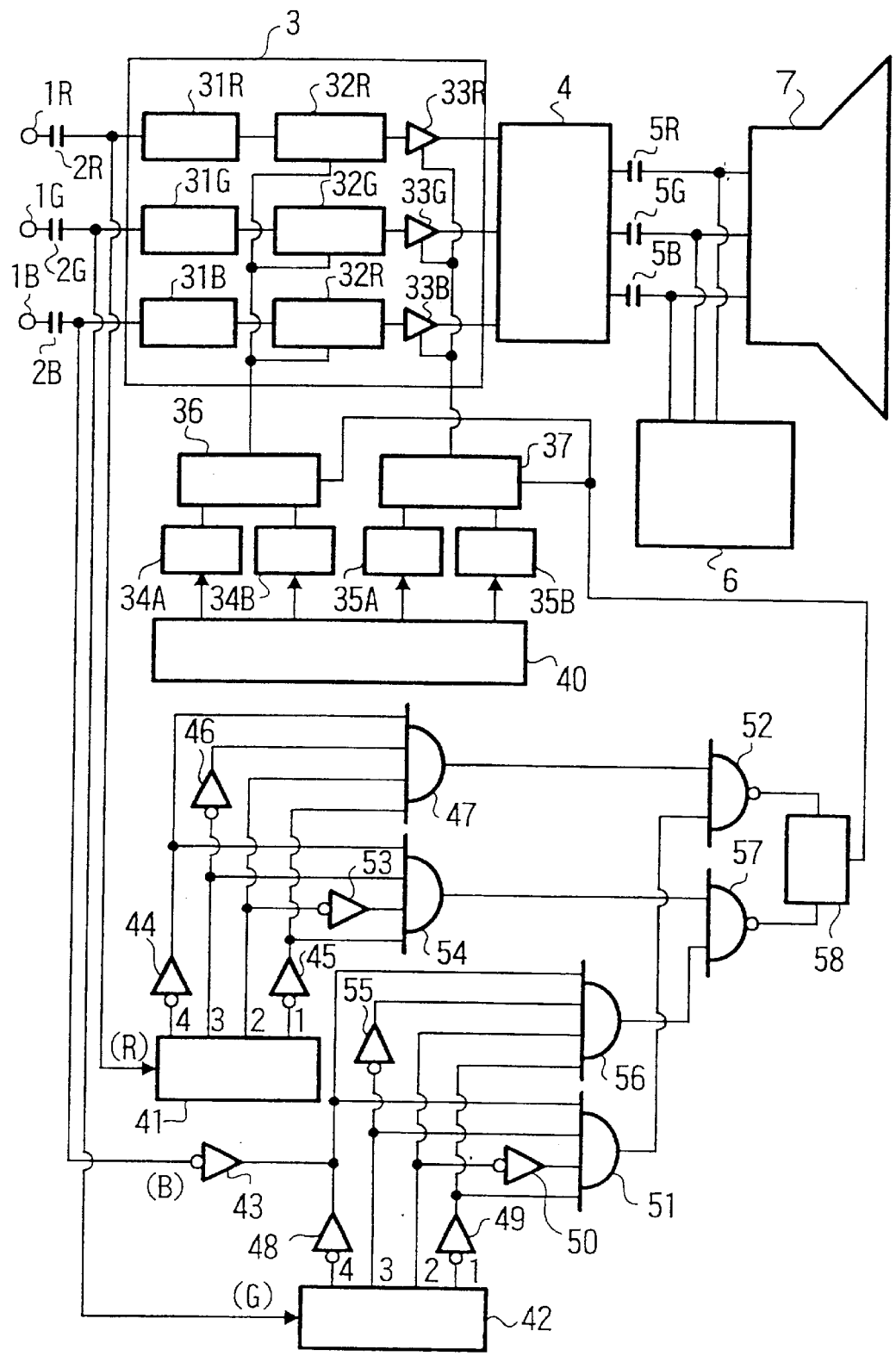
FIG. 4 is a structural diagram showing an example of the display apparatus according to a second mode for carrying out the present invention.
Figure 6A:
FIG. 6 is a diagram for explaining the same.
Figure 6B:
Figure 6C:
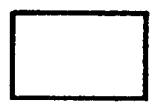
Figure 6D:
Figure 6E:
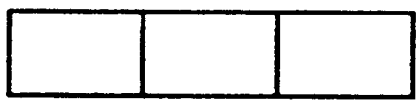
Figure 6F:
Figure 7A:
FIG. 7 is a diagram for explaining the same.
Figure 7B:
Figure 7C:
Figure 7D:
Figure 7E:
Figure 7F:

In contrast, the second mode for carrying out the present invention is such that the aforesaid signal for specifying the arbitrary area on the display screen is superposed on the image signal and then supplied. That is, FIG. 4 is a block diagram showing an example of a structure of a monitor display apparatus to which the display apparatus according to the second mode for carrying out the present invention is applied. In FIG. 4 also, corresponding parts to those of FIG. 1 are denoted by the same reference numerals to omit repeated descriptions.

In this FIG. 4, to input terminals 1R, 1G, 1B are supplied the image signal (R/G/B) on which the marker signals for specifying the arbitrary area on the display screen, e.g. from a computer (not shown) as a master unit are superposed. In this image signal here, e.g. as shown in A of FIG. 5, there are provided predetermined signal patterns 101, 102 along both horizontal end portions of the specified arbitrary area 100, which patterns are continuous in the vertical direction to form the marker signals.

Of these marker signals, e.g. the signal pattern 101 on the side of starting (left) end in the horizontal direction is, as shown in B of the figure, comprised of color signals arranged as stripes in order of blue, black, blue, red, blue, green, blue, black. Also, the signal pattern 102 on the side of finishing (right) end in the horizontal direction is, as shown in C of the figure, comprised of color signals arranged as stripes in order of blue, black, blue, green, blue, red, blue, black.

The third mode for carrying out the present invention is a marker signal making process characterized by comprising the steps of providing, in the image signal, signals in which primary color signals of respective predetermined levels are combined in arbitrary patterns, and using a pattern of one of the primary color signals as a clock as well as a pattern of the other primary color signals to form a marker code.

Thus, the image signals from these input terminals 1R, 1G, 1B are supplied to the above preamplifier IC 3. At the same time, e.g. the red image signal (R) from the input terminal 1R is supplied to an input terminal of a shift register 41, the green image signal (G) from the input terminal 1G being supplied to an input terminal of a shift register 42, and the blue image signal (B) from the input terminal 1B being supplied to clock terminals of the shift registers 41, 42 through an invertor 43.

Therefore, when the signal pattern 101 on the side of starting (left) end in the horizontal direction, e.g. as shown in A of FIG. 6 is supplied to the shift registers 41, 42, clocks are supplied after a slight delay from each fall of the blue signals, as shown in B of the figure. Due to the fall of the first blue signal, as shown in C of the figure, a signal at a timing of the first black signal is acquired.

Also, the fall of the second blue signal causes, as shown in D of the same figure, a signal at a timing of the red signal to be acquired. Again, the fall of the third blue signal causes, as shown in E of the figure, a signal at a timing of the green signal to be acquired. Further, the fall of the fourth blue signal causes, as shown in F of the figure, a signal at a timing of the last black signal to be acquired. In addition, these signals are shifted in turn to the right.

On the other hand, as to the aforesaid shift registers 41, 42, the red image signal (R) is supplied to the shift register 41 and the green image signal (G) is supplied to the shift register 42, respectively. For this reason, in the state that the above signal at a timing of the last black signal is acquired (F of FIG. 6), a signal is derived from the second bit in the shift register 41 and a signal is derived from the third bit in the shift register 42, respectively.

Referring again to FIG. 4, the second bit signal of the shift register 41 and inverted signals of other bits thereof ( inverters 44, 45, 46) are supplied together to an AND circuit 47, the third bit signal of the shift register 42 and inverted signals of other bits thereof (inverters 48, 49, 50) being supplied together to an AND circuit 51, and outputs of these AND circuits 47, 51 being supplied to a NAND circuit 52, thereby causing the signal pattern 101 on the side of starting (left) end in the horizontal direction to be detected.

Likewise, when the signal pattern 102 on the side of finishing (right) end in the horizontal direction, e.g. as shown in A of FIG. 7 is supplied to the shift registers 41, 42, clocks are supplied after a slight delay from each fall of the blue signals, as shown in B of the figure. The fall of the first blue signal causes, as shown in C of the figure, a signal at a timing of the first black signal to be acquired.

Also, the fall of the second blue signal causes, as shown in D of the figure, a signal at a timing of the green signal to be acquired. Again, the fall of the third blue signal causes, as shown in E of the figure, a signal at a timing of the red signal to be acquired. Further, the fall of the fourth blue signal causes, as shown in F of the figure, a signal at a timing of the last black signal to be acquired. In addition, these signals are shifted in turn to the right.

On the other hand, as to the aforesaid shift registers 41, 42, the red image signal (R) is supplied to the shift register 41 and the green image signal (G) is supplied to the shift register 42, respectively. For this reason, in the state that the above signal at a timing of the last black signal is acquired (F of FIG. 7), a signal is derived from the second bit in the shift register 41 and a signal is derived from the third bit in the shift register 42, respectively.

Referring again to FIG. 4, the third bit signal of the shift register 41 and inverted signals of other bits thereof (inverters 44, 45, 53) are supplied together to an AND circuit 54, the second bit signal of the shift register 42 and inverted signals of other bits thereof (inverters 48, 49, 55) being supplied together to an AND circuit 56, and outputs of these AND circuits 54, 56 being supplied to an NAND circuit 57, thereby causing the signal pattern 102 on the side of finishing (right) end in the horizontal direction to be detected.

Furthermore, the output of NAND circuit 52 is supplied to a set terminal (S) of a RS flip-flop 58 and the output of NAND circuit 57 is supplied to a reset terminal (R) of the RS flip-flop 58. Consequently, from a Q output of the RS flip-flop 58 is derived a distinction signal corresponding to a time period from the detection of the signal pattern 101 on the side of starting (left) end in the horizontal direction to the detection of the signal pattern 102 on the side of finishing (right) end.

This derived distinction signal is supplied to the abovesaid switching circuits 36, 37 which select the control DC voltages converted by the DAC circuits 34A or 34B, 35A or 35B. The control DC voltages selected by these switch circuits 36, 37 are supplied to the preamplifier IC 3. This causes the sharpness and contrast ratio of image in the arbitrary area specified by the aforesaid control signal among images displayed on CRT 7 to be varied.

That is, in this apparatus, it is possible to make higher than in other area, e.g. the sharpness and contrast ratio of acquired image of photograph, moving video, etc. only in the area 100 on the display screen, thereby allowing the picture quality of acquired image of photograph, moving video, etc. in the area 100 to be improved. In addition, the improvement of these picture quality can be implemented by the gamma correction, the color correction and the like.

Therefore, in this apparatus, by specifying the arbitrary area on the display screen and applying the arbitrary image processing only to that area, when displaying the acquired image of photograph, moving video, etc. together with the information on characters, numerics, etc., it is possible to improve the picture quality of acquired image without making the information on characters, numerics, etc. hard to see.

This means that the present invention can easily solve the problem, in which, when the acquired image is displayed together with the information on characters, numerics, etc. by means of conventional display apparatus, the picture quality of photograph, moving video, etc. looks remarkably deteriorated.

Figure 8:
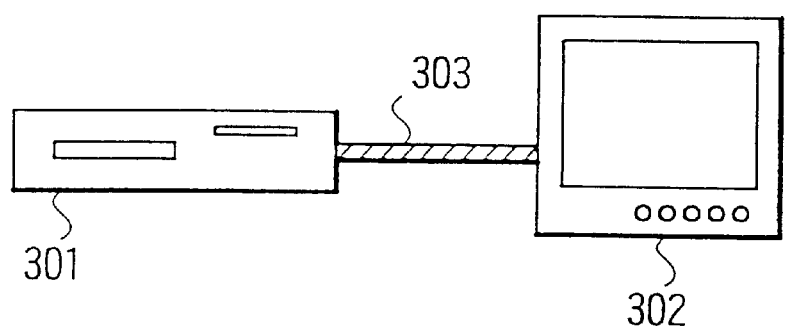
FIG. 8 is a diagram of its entire structure.

Moreover, in the second mode for carrying out the present invention, by only connecting the cable 303 for image signal, e.g. between the personal computer 301 and the monitor display apparatus 302 as shown in Fig.8, it is possible to improve the picture quality of acquired image of photograph, numerics, etc.

According to the third mode for carrying out the present invention, by providing, in the image signal, signals in which primary color signals on respective predetermined levels are combined in arbitrary patterns and using a pattern of one primary color signal as the clock as well as patterns of the other primary color signals to form a marker code, it is possible to detect the marker code easily and securely.

Figure 9:
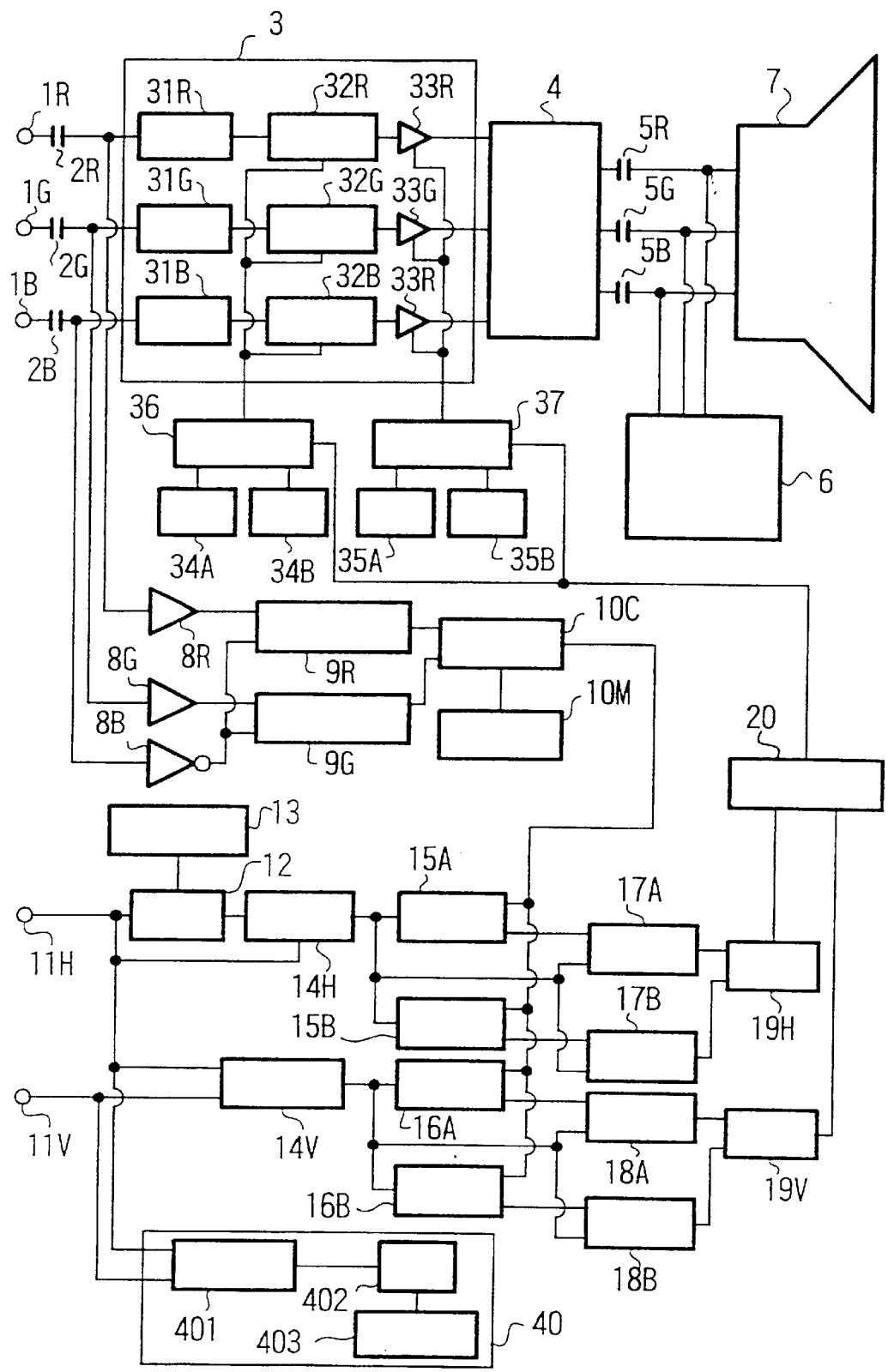
FIG. 9 is a structural diagram showing an example of the marker signal detector circuit according to a fourth mode for carrying out the present invention.

Furthermore, FIG. 9 shows another example of a structure in which the marker signal detector circuit as the fourth mode for carrying out the present invention is applied to the monitor display apparatus that the display apparatus as the second mode for carrying out the present invention is applied to. In a description of FIG. 9, corresponding parts to those of FIG. 4 are denoted by the same reference numerals to omit repeated descriptions.

Figure 10A:
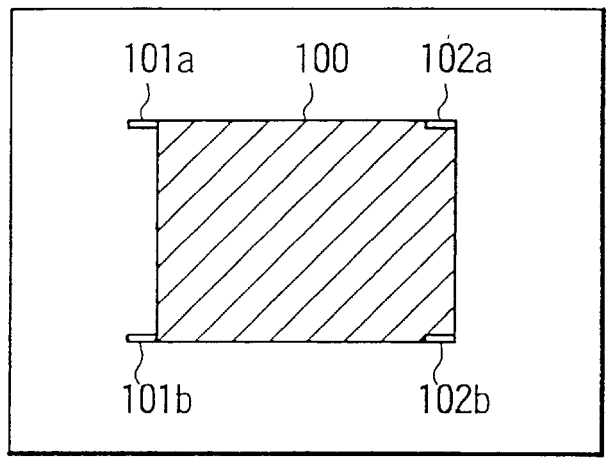
FIG. 10 is a diagram for explaining the same.
Figure 10B:
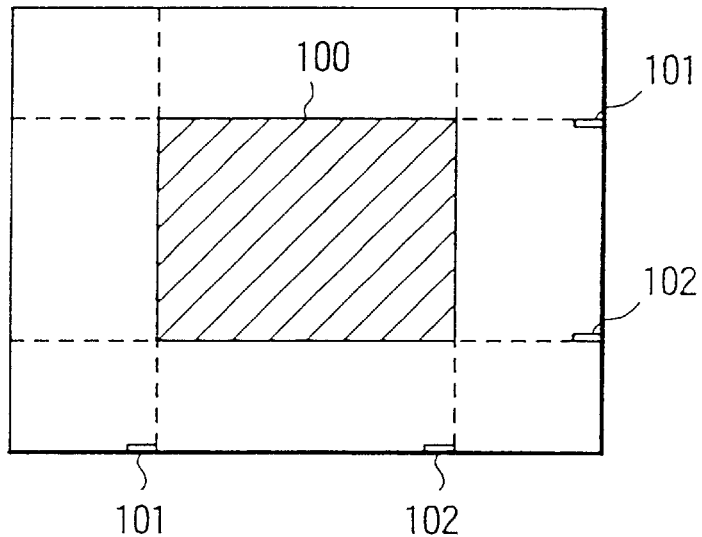

In FIG. 9, e.g. as shown in A of FIG. 10, horizontal starting (left) end signal patterns 101*a*, 101*b* and finishing (right) end signal patterns 102*a*, 102*b* which are similar to those of FIG. 5 are provided as the marker signals at positions corresponding to four corners of the arbitrary area 100 on the display screen, e.g. within one horizontal period, respectively.

In FIG. 9, a horizontal synchronizing signal from an input terminal 11H is supplied to a PLL circuit 12, which is supplied with an oscillatory signal from an oscillator 13 to form an arbitrary clock signal synchronized with the horizontal synchronizing signal. This clock signal is supplied to a count terminal of a horizontal counter 14H whose reset terminal receives the horizontal synchronizing signal or a signal synchronized therewith. This causes a count value corresponding to a horizontal position on the display screen to be obtained from the horizontal counter 14H.

Also, the horizontal synchronizing signal is supplied to a count terminal of a vertical counter 14V whose reset terminal receives a vertical synchronizing signal or a signal synchronized therewith. This causes a count value corresponding to a vertical position on the display screen to be obtained from the vertical counter 14V. The count values of these horizontal counter 14H and the vertical counter 14V are supplied to latch circuits 15A, 15B and 16A, 16B, respectively.

Furthermore, the image signals from the input terminals 1R, 1G are supplied through amplifiers 8R, 8G to in put terminals of shift registers 9R, 9G. At the same time, the image signal from the input terminal 1B is supplied through a comparator 8B to clock terminals of the shift registers 9R, 9G. The signals stored in these shift registers 9R, 9G are supplied to a comparator 10C, which compares them with the signal pattern 101 or 102 stored, e.g. in a memory 10M.

This also enables the signal patterns 101, 102 to be detected in the same way as through circuits from the shift registers 41, 42 to the NAND circuits 52, 57 in FIG. 4. Additionally, the circuits from the shift registers 41, 42 to the NAND circuits 52, 57 may be provided in this section instead. Detection signals of the signal patterns 101, 102 detected by the comparator 10C or the NAND circuit 52, 57 are supplied to trigger terminals of the latch circuits 15A, 16A and 15B, 16B, respectively.

Thus, in the latch circuit 15A is latched the count value corresponding to a horizontal position on the display screen, e.g. of the signal pattern 101*a* or 101*b*. Also, in the latch circuit 15B is latched the count value corresponding to a horizontal position on the display screen, e.g. of the signal pattern 102*a* or 102*b*.

Further, in the latch circuit 16A is latched the count value corresponding to a vertical position on the display screen, e.g. of the signal pattern 101*a* or 102*a*. Also, in the latch circuit 16B is latched the count value corresponding to a vertical position on the display screen, e.g. of the signal pattern 101*b* or 102*b*.

The signals latched in these latch circuits 15A, 15B and 16A, 16B are supplied to comparators 17A, 17B and 18A, 18B, respectively. At the same time, the count values of the horizontal counter 14H and vertical counter 14V are supplied to the comparators 17A, 17B and 18A, 18B, respectively.

In consequence, a signal is derived from the comparator 17A when the count value of horizontal counter 14H coincides with the count value for a horizontal position of the signal pattern 101*a* or 101*b* latched in the latch circuit 15A. Likewise, a signal is derived from the comparator 17B when the count value of horizontal counter 14H coincides with the count value for a horizontal position of the signal pattern 102*a* or 102*b* latched in the latch circuit 15B.

Moreover, a signal is derived from the comparator 18A when the count value of vertical counter 14V coincides with the count value for a vertical position of the signal pattern 101*a* or 102*a* latched in the latch circuit 16A. Also, a signal is derived from the comparator 18B when the count value of vertical counter 14V coincides with the count value for a vertical position of the signal pattern 101*b* or 102*b* latched in the latch circuit 16B.

The signals from these comparators 17A and 17A are supplied to the set and reset terminals of a flip-flop 19H, thereby making the pulse signal corresponding to the horizontal width of the area 100 as shown in B of FIG. 2 to be derived. Likewise, the signals from the comparators 18A and 18A are supplied to the set and reset terminals of a flip-flop 19V, thereby making the pulse signal corresponding to the vertical width of the area 100 as shown in C of FIG. 2 to be derived.

The signals from these flip-flops 19H and 19V are composed by a multiplier 20 into the control signal, e.g. such as shown in D of FIG. 2. This control signal is then supplied to the above-said switching circuits 36, 37 which select the control DC voltages converted by the DAC circuits 34A or 34B, 35A or 35B, thereby causing the sharpness and contrast ratio of image in the arbitrary area specified by the control signal among images displayed on CRT 7 to be changed.

That is, in this apparatus, it is possible to make higher than in other area, e.g. the sharpness and contrast ratio of acquired image of photograph, moving video, etc. only in the area 100 on the display screen, thereby allowing the picture quality of acquired image of photograph, moving video, etc. to be improved. In addition, these picture quality can also be improved by means of the gamma correction, the color correction and the like.

Therefore, in this apparatus also, by specifying the arbitrary area on the display screen and applying the arbitrary image processing only to that area, when displaying the acquired image of photograph, moving video, etc. together with the information of characters, numerics, etc., it is possible to improve the picture quality of acquired image without making the information on characters, numerics, etc. hard to see.

Moreover, as the fourth mode for carrying out the present invention, by comprising the first memory for acquiring patterns of other primary color signals at a timing of a clock according to a pattern of one primary color signal, the second memory for storing beforehand the patterns of other primary color signals to form the marker code, and a comparator means for shifting in turn the patterns acquired in the first memory and comparing it with the patterns stored in the second memory, it is possible to detect the marker code easily and securely.

In this example also, e.g. as shown in FIG. 8, by only connecting the cable 303 for image signal, e.g. between the personal computer 301 and the monitor display apparatus 302, it is possible to improve the picture quality of acquired image of photograph, moving video, etc.

Furthermore, the above described embodiment in FIG. 9 can perform the processing, for example, even when the computer side forms a cursor, etc. which is superposed on the signal patterns 101*a*, 102*a*, 101*b*, 102*b*. Specifically, the above described apparatus will fail to detect the signal patterns by the aforesaid circuit 40, for example, if the computer side forms the cursor, etc. superposed on the signal patterns.

However, according to the above embodiment in FIG. 9, any one of the signal patterns 101*a*, 101*b* needs only be detected for the starting end in the horizontal direction and any one of the signal patterns 102*a*, 102*b* needs only be detected for the finishing end. If only the one of these patterns is detected, then the processing takes place. Likewise, either of the signal patterns 101*a*, 102*a* or the signal patterns 101*b*, 102*b* needs only be detected for the upper and lower ends in the vertical direction. As far as any one of them is detected, t he processing takes place.

Therefore, in the above-mentioned apparatus, for example, even if the computer side forms the cursor, etc. superposed on the signal patterns, the processing can be performed. Because the cursor is usually small in size as compared with the specified area 100, it is impossible that such cursor overlaps simultaneously two or m or e signal patterns. If such cursor is unlikely to overlap the signal pattern, for example, the right lower signal pattern 102*b* can be dispensed with.

Moreover, in the above apparatus, as shown in B of FIG. 10, for example, signal patterns 101, 102 may be provided on extensions of two horizontal lines between the starting and finishing ends of the area 100 in the horizontal direction as well as two vertical lines between the upper and lower ends in the vertical direction for the processing to be performed. In this case, for example, by positioning the signal patterns 101, 102 outside the display screen, the likelihood that the cursor overlaps the signal pattern will greatly be reduced.

Furthermore, in the above apparatus, by making the signal patterns 101, 102 forming the marker signals into a plurality of sets each having the same or different patterns, it is possible to specify a plurality of areas on the display screen. Then, by applying the image processings each of which is the same or different to the plurality of specified areas, it is possible to perform the improvement of picture quality that is the most suitable for respective images on the screen in which images of different quality are combined.

Figure 11:
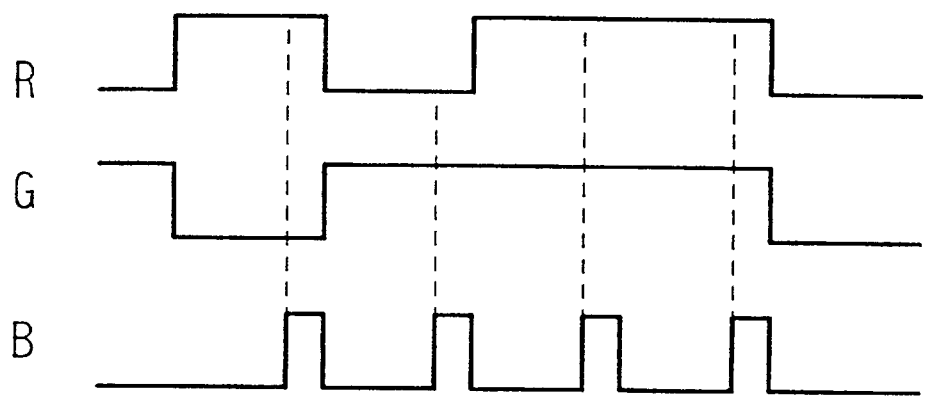
FIG. 11 ia an explanatory diagram of another example of the marker signal making process according to the third mode for carrying out the present invention.

FIG. 11 shows another example of the marker signal making process as the third mode for carrying out the present invention. In FIG. 11, e.g. blue (B) signals of the primary color signals are used as the clock to make the marker signals using red (R) and green (G) signals. At each timing of rises of the blue (B) signals (falls of the inverted signals), signal patterns of red (R) and green (G) are acquired, e.g. by the shift registers 9R, 9G.

Specifically, in the illustrated example, for example, the shift register 9R acquires a pattern (1011) and the shift register 9G acquires a pattern (0111). These patterns are then compared with the patterns stored in the memory 10M, thus making, e.g. the signal patterns 101, 102, etc. forming the arbitrary marker signals to be detected. In addition, the illustrated signal forms are a mere example and so, for example, the above patterns may be changed or the number of bits may be varied to make many kinds of signal patterns.

Further, in the example of FIG. 11, the signals are formed so that the clock timing using e.g. blue (B) signals may not coincide with transitions of the signal patterns of red (R) and green (G). This allows the stable detection (acquisition by shift registers ) of the signal patterns to be performed.

Again, in the structure of apparatus in FIG. 9, e.g. blue (B) signals are supplied through the comparator 8B to the clock terminals of shift registers 9R, 9G. This will cause a slight delay in the clock timing depending on, e.g. blue (B) signals.

Arranging in this way results in the following effects. In case of image signals in which a white and a black pattern occurs alternately, e.g. as characters and numerics, random signals are detected due to the influence of a time lag of the red (R) and green (G) signals at an edge portion of, e.g. blue (B) signals, which will cause a likelihood that the arbitrary pattern may be misdetected. However, by causing the aforesaid delay, the white is detected securely even in such above case. If such a pattern as all "one" is not adopted, the likelihood of misdetecting the pattern can be removed.

By the way, the signal pattern are placed forward of the area 100 in the horizontal direction in A and B of FIG. 10. This is because the signal pattern is detected at a timing of the last black as shown in FIG. 6 in FIG. 7. However, this can be revised optionally by providing a time revising means.

Figure 12:
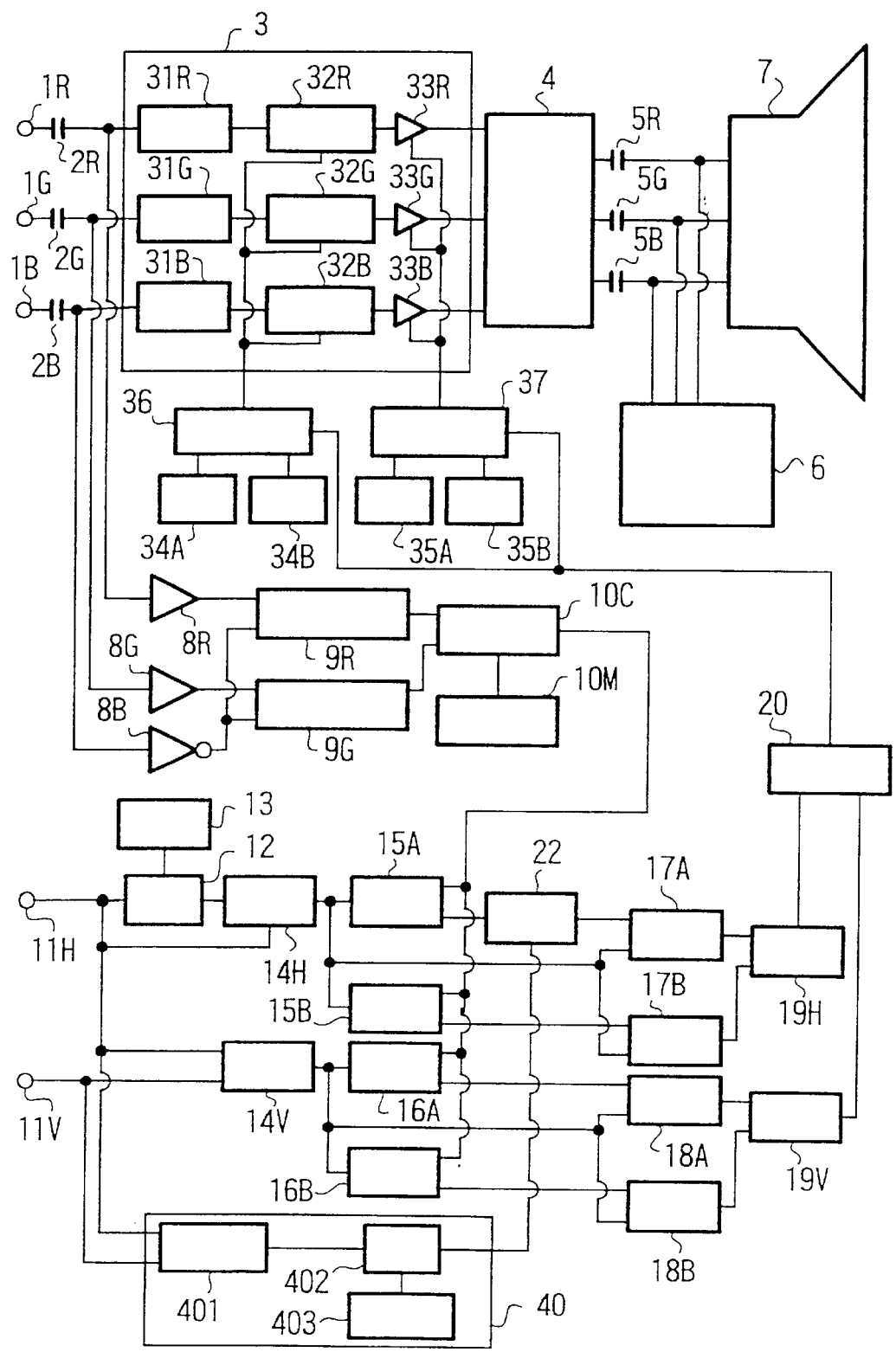
FIG. 12 ia a structural diagram showing an example of the control signal generator circuit according to a fifth mode for carrying out the present invention.

Furthermore, FIG. 12 shows a structure of the control signal generator circuit for revising the position of signal patterns as the fifth mode for carrying out the present invention. This FIG. 12 shows an example in a case where the above circuit is applied to the monitor display apparatus that the display apparatus as the second mode for carrying out the present invention is applied to. In a description of FIG. 12, corresponding parts to those of FIG. 4 are denoted by the same reference numerals to omit repeated descriptions.

In FIG. 12, the horizontal and vertical synchronizing clock supplied to the input terminals 11H, 11V are supplied to a timer 401 built in the microcomputer 40, where frequencies of the horizontal and vertical synchronizing signals are measured. The measured frequencies of the horizontal and vertical synchronizing signals are supplied to a central processing unit (hereinafter referred to as CPU) 402 where the time length of signal pattern forming the marker signals is found from data stored, e.g. in a memory 403.

The measured value of horizontal synchronizing clock corresponding to the above obtained time length is calculated by CPU 402. The calculated value is supplied from the microcomputer 40 to a subtracter 22 provided, e.g. on an output side of a latch circuit 15A. This enables the subtracter 22 to shift the positions of marker signals stored, e. g. in the latch circuit 15A forward in the horizontal direction by the obtained time length.

Figure 13:
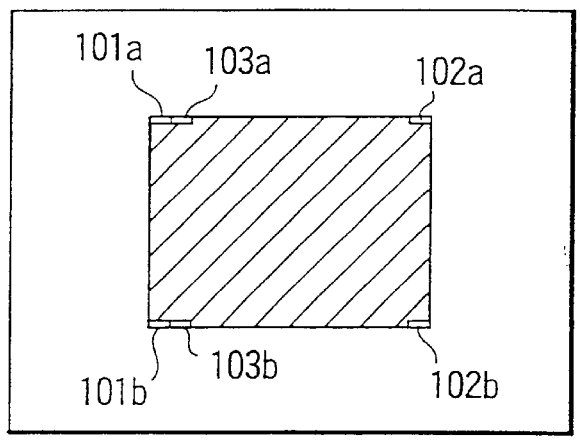
FIG. 13 is a diagram for explaining the same.

This means that the signal patterns 101a, 101b forming the marker signals can be provided, e.g. as shown in FIG. 13, inward of the area 100 detected by the marker signals. Hence, it is possible, for example, to make the signal patterns 101a, 101b forming the marker signals without projecting them from the area 100, thus allowing the set up of area 100 to be facilitated.

Figure 14:
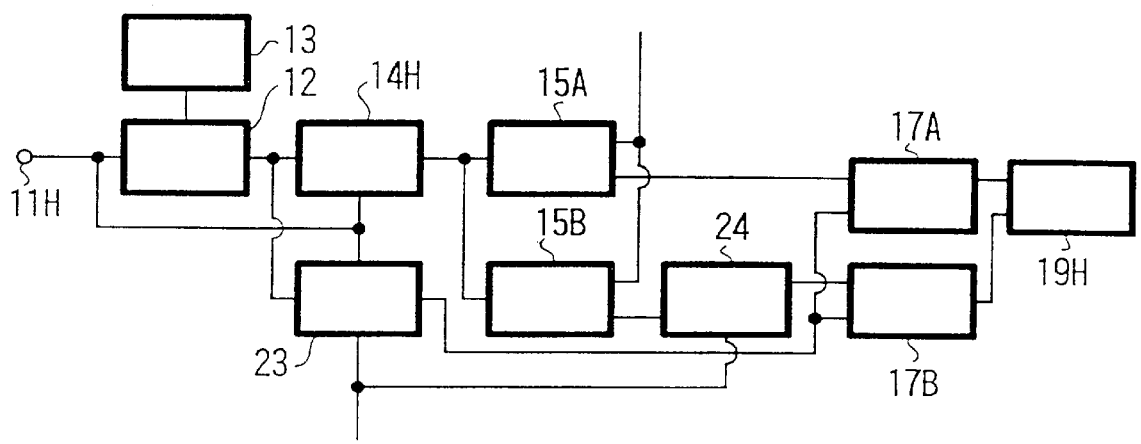
FIG. 14 is a structural diagram showing another example of the control signal generator circuit according to the fifth mode for carrying out the present invention.

Moreover, FIG. 14 shows another structural example of the control signal generator circuit as the fifth mode for carrying out the present invention. Additionally, this FIG. 14 shows only the main parts and the others are the same as those of FIG. 12.

In FIG. 14, a counter 23 is provided that count simultaneously with the horizontal counter 14H, for example. This counter 23 is preloaded with position revising data corresponding to the time length from the computer 40 (not shown). The count value of counter 23 is supplied to comparators 17A and 17A. At the same time, an adder 24 is provided on an output side of a latch circuit 15B. In this adder 24 the position revising data mentioned above is added.

That is, in this case, the position part of display screen is shifted relatively backward and further the position revising data is added to the output of latch circuit 15B, so that the area 100 can be detected by the signal patterns 101a, 101b, 102a, 102b provided inward of the area 100. Moreover, in this case, by using the adder instead of the subtractor, it is possible to reduce the whole circuit scale.

Furthermore, in the above described control signal generator circuit, by adding a code to the marker signals that makes measurable of the time length of signal pattern, as the sixth mode for carrying out the present invention, it is possible to revise the position of signal pattern more satisfactorily. Particularly, in FIG. 13, for example, arbitrary signal patterns (codes) 103a, 103b indicating the end of pattern are added subsequently to the signal patterns 101a, 101b forming the marker signals.

Figure 15:
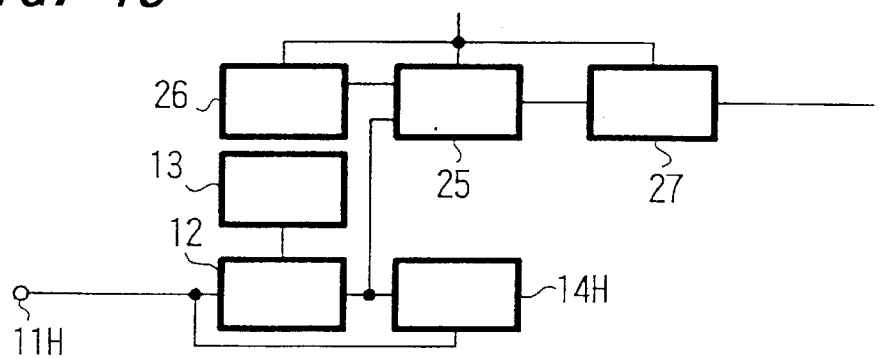
FIG. 15 is a structural diagram showing an example of the control signal generator circuit according to a sixth mode for carrying out the present invention.

When performing the measurement using these signal patterns 103a, 103b, it can be dome, e.g. in a manner as shown in FIG. 15. In FIG. 15, e.g. a counter 25 is provided that counts simultaneously with the horizontal counter 14H. At the same time, e.g. a flip-flop 26 is provided that is set/reset by detecting signals of the signal patterns 101a, 101b and 103a, 103b. The counting of counter 25 is controlled by the output of flip-flop 26.

This causes the counter 25 to output a count value corresponding to a time, e.g. from the finishing ends of signal patterns 101a, 101b to the finishing ends of signal patterns 103a, 103b. Thus, by positioning the signal patterns 103a, 103b so that the aforesaid time may become the time length of signal patterns 101a, 101b, the time length of the aforesaid signal patterns can be measured. By providing this count value in the latch circuit 27, it is possible to revise the position of signal patterns in the same way as above.

Thus, in this case, it is possible to revise the position of signal pattern by measuring the time length of signal pattern without using the microcomputer 40.

Moreover, when, e.g. the computer (not shown) as a master unit produces image signals supplied to the input terminals 1R, 1G, 1B, the processing to provide such signal pattern requires, e.g. only adding of soft ware and needs no procedure of hardware on the side of computer (not shown) as a master unit, etc. Thus, the above described apparatus to which the present invention is applied can be connected to an optional general purpose computer, etc. for use.

Furthermore, the above described present invention can be applied also where the image signals provided with such signal patterns are recorded in a recording medium such as a video tape or video disk and displayed by reproducing such recording medium.

Again, according to the aforesaid apparatus, there is no need for the user to make any operation for the above processing because the processing is performed automatically. Besides, even if, for example, the area 100 moves or changes in size, it is possible to make the change of position or size to be followed.

The seventh mode for carrying out the present invention is the display apparatus which receives a plurality of image signals, displays those signals on respective windows, and is able to apply different image processings to every windows displaying these plural image signals and the other area.

Figure 16:
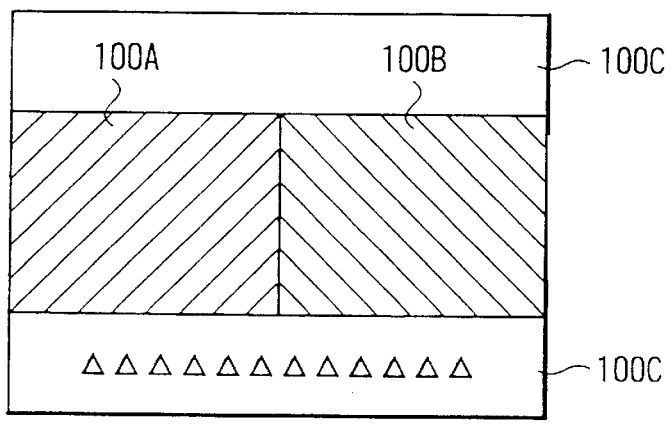
FIG. 16 is a diagram for explaining the display apparatus according to a seventh mode for carrying out the present invention.
Figure 17:
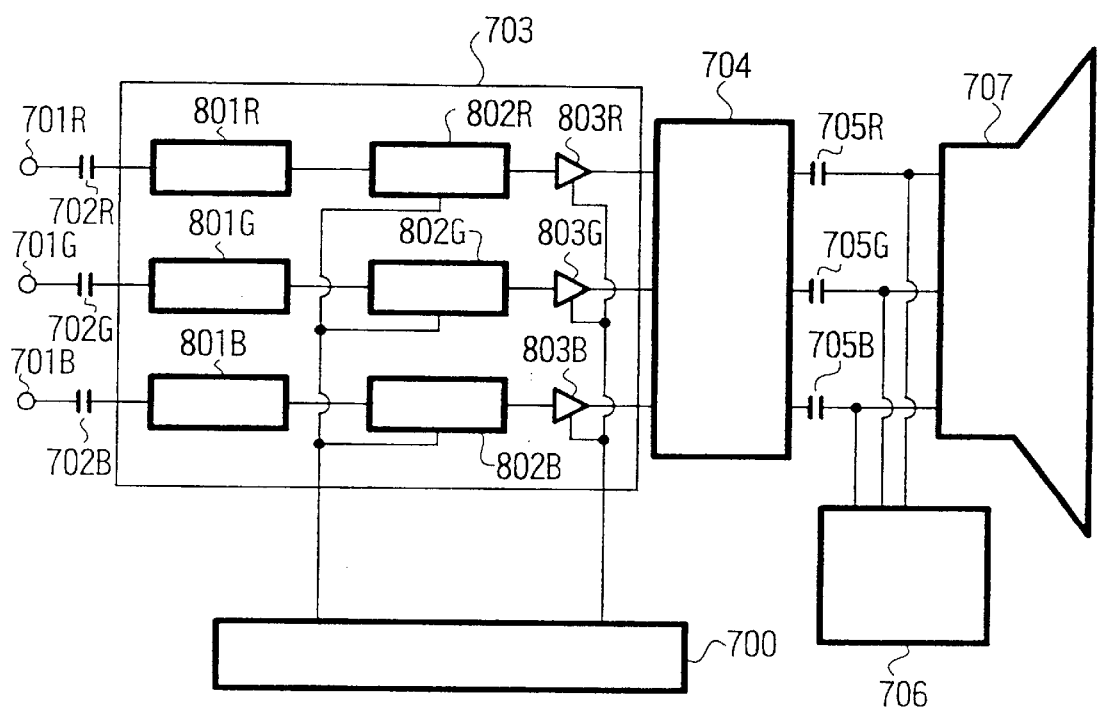
FIG. 17 is a diagram for explaining the conventional apparatus.

Specifically, e.g. in a television receiver, it is common, as shown in FIG. 16, for a plurality of input image signals to be displayed in a composite manner on the respective windows 100A, 100B. There are further cases where, e.g. characters and numerics (Δ Δ Δ Δ) are displayed on a window 100C which such image signals are not composed.

So, in such a television receiver, by applying the different image processings to every windows 100A, 100B and 100C, the picture quality of acquired image can be improved without making the information, e.g. on characters, numerics, etc. hard to see. Additionally, in this case, the detection of windows 100A, 100B, 100C, etc. can be performed,e.g. by composing circuits inside the television receiver, so that there is no need to provide the particular marker signals or the like for the detection.

As described above, according to the display apparatus for displaying the image as the first mode for carrying out the present invention, by providing the control signal for specifying the arbitrary areas on the display screen and providing the image processing means for applying the respective arbitrary image processings to the specified areas based on the control signal, the picture quality of acquired image of photograph, moving video etc. can be improved without making the information on characters, numerics, etc. hard to see.

Likewise, according to the display apparatus for displaying the image as the second mode for carrying out the present invention, by supplying the image signal to which the marker signals marking the arbitrary areas on the display screen are afforded and providing the image processing means for detecting the marker signals and applying different image processings to every detected areas, the picture quality of acquired image of photograph, moving video, etc. can be improved without making the information on characters, numerics, etc. hard to see.

Also, according to the marker signal making process as the third mode for carrying out the present invention, by providing, in the image signal, the signals in which primary color signals on respective predetermined levels are combined in arbitrary patterns, and using a pattern of one primary color signal as the clock to make the marker code using patterns of the other primary color signals, the detection of the marker code can be performed easily and securely.

Moreover, according to the marker signal detector circuit as the fourth mode for carrying out the present invention, for the marker signals that are made by providing, in the image signal, the signals in which primary color signals on respective predetermined leveled are combined in arbitrary patterns and by using a pattern of one primary color signal as the clock to form the marker code using patterns of the other primary color signals, and that specify the arbitrary area on the screen displaying at least the image signal, there are provided the first memory for acquiring the pattern of other primary color signals at a timing of the clock according to the pattern of one primary color signal, the second memory for storing beforehand the pattern of other primary color to form the marker code, and the comparator means for shifting in turn the patterns acquired in the first memory and comparing it with the patterns in the second memory, thereby allowing the marker code to be detected easily and securely.

Furthermore, according to the control signal generator circuit as the fifth mode for carrying out the present invention, for the marker signals that are made by providing, in the image signal, the signals in which primary color signals on respective predetermined levels are combined in arbitrary patterns and by using a pattern of one primary color signal as the clock to form the marker code using patterns of the other primary color signals, and that specify the arbitrary area on the screen displaying at least the image signal, there are provided the detector means for detecting the marker signal, the measuring means for measuring the frequencies of horizontal and vertical synchronizing signals in the image signal, the processor means for obtaining the time length of marker signal from the measured frequencies of horizontal and vertical synchronizing signals, and the revising means for revising the horizontal position of marker signal using the obtained time length, thereby enabling the signal pattern forming the marker signals to be made without projecting from that area, and thus enabling the setup of that area to be facilitated.

Likewise, according to the control signal generator circuit as the sixth mode for carrying out the present invention, for the marker signals that are made by providing, in the image signal, the signals in which primary color signals on respective predetermined levels are combined in arbitrary patterns and by using a pattern of one primary color signal as the clock to form the marker code using the patterns of other primary color signals, and that specify the arbitrary area on the screen displaying at least the image signal and have a code added at least to the marker signal provided at the horizontal starting end of that area for making measurable of the length of the marker signal, there are provided the detector means for detecting the marker signal, the processor means for obtaining the time length of marker signal using the code making its length measurable, and the revising means for revising the horizontal position of marker signal using the obtained time length, thereby allowing the signal patterns forming the marker signals to be made without projecting from that area, and thus allowing the setup of that area to be facilitated.

Moreover, according to the display apparatus as the seventh mode for carrying out the present invention, the display apparatus receiving a plurality of image signals and displaying the plurality of image signals on the respective windows is provided with the image processing means for applying different image processings to the windows displaying the plurality of image signals and the other area, thereby enabling the picture quality of acquired image to be improved without making the information on characters, numerics, etc. hard to see.

In addition, the present invention is not limited to the above described modes for carrying out the same and various modification can be made without departing from the spirit of the present invention.

What is claimed is:

1. A marker signal making process characterized by providing, in an image signal, signals in which primary color signals on respective predetermined levels are combined in arbitrary patterns, and using a pattern of one of said primary color signals as a clock to form a marker code using patterns of the other primary color signals to specify an arbitrary area on a screen displaying said image signal, comprising:
processing means for obtaining a time length of said marker signal based on measured frequencies of horizontal and vertical synchronizing signals in said image signal; and
revising means for revising a horizontal position of said marker signal using said obtained time length.

2. The marker signal making process according to claim 1, wherein
a timing of said clock using said pattern of said one of said primary color signals is shifted from a transition point of said patterns of the other primary color signals.

3. The marker signal making process according to claim 1, wherein
when said arbitrary area on said screen displaying said image signal is specified by said maker signal,
a code for making measurable of a length of said marker signal is added to said marker signal provided at a horizontal starting end of said arbitrary area.

4. A marker signal detector circuit for marker signals that are made by providing, in an image signal, signals in which primary color signals on respective predetermined levels are combined in arbitrary patterns and by using a pattern of one of said primary color signals as a clock to form a marker code using patterns of the other primary color signals, and that specify an arbitrary area on a screen displaying said image signal, comprising:

processing means for obtaining a time length of said marker signal based on measured frequencies of horizontal and vertical synchronizing signals in said image signal;

revising means for revising a horizontal position of said marker signal using said obtained time length;

a first memory for acquiring said patterns of the other primary color signals at a timing of the clock using said pattern of one primary color signal, a second memory for storing beforehand said patterns of the other primary color signals to form said marker code; and comparator means for shifting in turn the patterns acquired in said first memory and comparing them with the patterns stored in said second memory.

5. The marker signal detector circuit according to claim 4, further comprising means for giving a predetermined delay in detecting the clock timing based on said pattern of said one of said primary color signals when acquiring said patterns of the other primary color signals.

6. A control signal generator circuit for marker signals that are made by providing, in an image signal, signals in which primary color signals on respective predetermined levels are combined in arbitrary patterns and by using a pattern of one primary color signal as a clock as well as patterns of the other primary color signals to form a marker code, and that specify an arbitrary area on a screen displaying at least said image signal, comprising:

a detector means for measuring frequencies of horizontal and vertical synchronizing signals in said image signal, a measuring means for measuring frequencies of horizontal and vertical synchronizing signals in said image signal, a processing means for obtaining a time length of said marker signal from said measured frequencies of horizontal and vertical synchronizing signals, and a revising means for revising a horizontal position of said marker signal using said obtained time length.

7. A control signal generator circuit for marker signals that are made by providing, in an image signal, signals in which primary color signals on respective predetermined levels are combined in arbitrary patterns and by using a pattern of one primary color signal as a clock as well as patterns of the other primary color signals to form a marker code, and that specify an arbitrary area on a screen displaying at least said image signal and have a coded added at least to said marker signal provided at a horizontal starting end of said area for making measurable a length of said marker signal, comprising a detector means for detecting said marker signals, a processing means for obtaining a time length of said marker signal using said code for making said length measurable, and a revising means for revising a horizontal position of said marker signal using said obtained time length.

* * * * *